Patented Dec. 17, 1946

2,412,784

UNITED STATES PATENT OFFICE 2,412,784

LEAD PHTHALATES AND PROCESS FOR PREPARING SAME

Alexander Stewart, Mountain Lakes, N. J., and Adrian R. Pitrot, Hempstead, and Leonard M. Kebrich, Brooklyn, N. Y., assignors to National Lead Company, New York, N. Y., a corporation of New Jersey No Drawing. Application September 11, 1943, Serial No. 502,066

9 Claims. (Cl. 260—435)

The present invention relates to lead salts of phthalic acid and a process for making such salts.

One object of this invention is to offer a new and economical process for making lead phthalates which are useful as pigments either alone or in combination with other pigments particularly in the formulation of paints. Another object is to produce two novel basic lead phthalates, previously unknown in the art. Still other objects will become apparent as the description of the invention proceeds.

The lead phthalates prepared according to the present invention include normal lead phthalate, monobasic lead phthalate and dibasic lead phthalate. Of these only normal lead phthalate has been previously described but the compound was formerly made by processes entirely different from the one to be herein described. One such former process for making normal lead phthalate was to mix phthalic acid and the carbonate or acetate of lead. This process was costly and the product resulting therefrom unavoidably contained impurities of unreacted products not easily removed by washing. Another method of preparing normal lead phthalate consisted in reacting a solution of lead nitrate and alkali phthalate.

It has now been found that in addition to the normal salt, two hitherto unknown well defined basic phthalates of lead are formed. These compounds are:

1. Dibasic lead phthalate, containing two mols of lead monoxide and one mol of lead phthalate, analyzing 81.00% PbO, 17.91% phthalic anhydride and 1.09% water and corresponding to the formula $2PbO.PbC_6H_4(COO)_2.\tfrac{1}{2}H_2O$. This compound is a white solid having a specific gravity of 4.60 and a refractive index of 1.99.

2. Monobasic lead phthalate, containing one mol of lead monoxide and one mol of lead phthalate, analyzing 75.10% PbO, 24.90% phthalic anhydride, corresponding to the formula

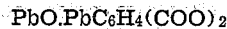

$PbO.PbC_6H_4(COO)_2$

This compound is likewise a white solid, but has a specific gravity of 3.87 and a refractive index of 1.99.

Both these compounds are water-insoluble, opaque solids with an acicular crystalline structure desirable for pigment purposes.

Broadly, the present invention contemplates reacting phthalic anhydride or phthalic acid with a lead oxide in the presence of water. In its preferred form, the process of the present invention may be carried out by adding phthalic anhydride or a phthalic acid solution to a hot slurry of lead monoxide at a constant rate, which rate is slightly slower than the rate at which it is reacted upon by the liquid phase of lead monoxide or basic phthalate, as indicated by a constant pH value or electrical conductivity of the liquid phase during the process. Such a process has been found to be conducive to the formation of products of uniform chemical composition of high purity and desirable physical characteristics.

While the process proceeds smoothly in hot solutions without the aid of a catalytic substance such as nitric or formic acid, the presence of a small amount of such agents may be desirable in any cases where the lead monoxide contains considerable coarse material, or where it is desired to shorten the time required for the completion of the reaction involved. The amount of the catalytic agent employed may vary, the usual amount being from 0.10 to 0.15 pound per 100 pounds of lead monoxide. The process may be conducted at temperatures ranging from about 15° C. to about 100° C. but it is preferred to operate at temperatures between about 75° C. and 95° C.

In order more particularly to illustrate the present invention, the following specific examples are given from which it will be noted that the dibasic, monobasic and normal-lead phthalates may be successively formed by employing successively increased amounts of phthalic acid solution or phthalic anhydride:

EXAMPLE I

*Dibasic lead phthalate*

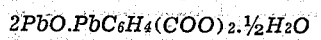

$2PbO.PbC_6H_4(COO)_2.\tfrac{1}{2}H_2O$

A solution of 30 pounds of phthalic anhydride, dissolved in 63 gallons of water at a temperature of 95–99° C. was slowly and continuously added to a vigorously stirred suspension of 136 pounds of lead monoxide in 162 gallons of water, (i. e., phthalic anhydride in the ratio of 1 mol to 3 mols of lead monoxide) and the slurry was held at a temperature of 85–90° C. The rate of addition of the phthalic acid was so regulated that the reaction was completed in about six hours. Coincident with the end of the reaction a sharp decrease in the pH value of the liquid phase is noted, the previously constant value of 9.3 dropping to 8.5 as measured at 25° C. The product was filtered and dried and was found to be pure dibasic phthalate of lead, hemihydrated, the yield being substantially 100%.

EXAMPLE II

*Monobasic lead phthalate, $PbO.PbC_6H_4(COO)_2$*

A hot solution of 37.5 pounds of phthalic anhydride in 63 gallons of water was slowly and continuously added to a vigorously agitated slurry of 113.1 pounds of lead monoxide in 150 gallons of water (i. e., phthalic anhydride in the ratio of 1 mol to 2 mols of lead monoxide) and held at a temperature of 85–90° C. The rate of addition of the acid was so regulated that the reaction was completed in about six hours. During the reaction the dibasic lead phthalate was formed as an intermediate product and was reacted upon by the continued addition of phthalic acid. The formation of the monobasic lead phthalate was characterized by an abrupt drop in pH value of the liquid phase from 8.5 to 6.5 as measured at 25° C. The product was white monobasic phthalate of lead, the yield being substantially 100%.

EXAMPLE III

*Normal lead phthalate, $PbC_6H_4(COO)_2$*

A hot solution of 59.9 pounds of phthalic anhydride in 85 gallons of water, was slowly and continuously added to a vigorously agitated suspension of 90.32 pounds of lead monoxide in 125 gallons of water (i. e., phthalic anhydride in the ratio of 1 mol to 1 mol of lead monoxide) and held at a temperature of 85–90° C. The rate of addition of the acid was so regulated that the reaction was completed in about six hours. During the course of the reaction, the dibasic and monobasic lead phthalates were successively formed as intermediate products and successively reacted upon by the continued addition of phthalic acid. The formation of the normal lead phthalate was indicated by an abrupt drop of the pH value of the liquid phase from 6.5 to 5.1 as measured at 25° C. The product was the pure white normal lead phthalate $$PbC_6H_4(COO)_2$$

the yield being substantially 100%.

From the foregoing, the chemical process involved in this invention may be conceived as successively occurring according to the following equations:

1. $3PbO + C_6H_4(COOH)_2 = 2PbO \cdot PbC_6H_4(COO)_2 \cdot \tfrac{1}{2}H_2O + \tfrac{1}{2}H_2O$ 2. $2[2PbO \cdot PbC_6H_4(COO)_2 \cdot \tfrac{1}{2}H_2O] + C_6H_4(COOH)_2 = 3[PbO \cdot PbC_6H_4(COO)_2] + 2H_2O$ 3. $PbO \cdot PbC_6H_4(COO)_2 + C_6H_4(COOH)_2 = 2PbC_6H_4(COO)_2 + H_2O$ Thus the continued addition of phthalic acid to an aqueous suspension of lead monoxide causes the formation, in succession, of dibasic lead phthalate, monobasic lead phthalate, and normal lead phthalate. It is obvious that mixtures within a wide range of desired basicity or composition may be obtained by stopping the process at any point desired. Pigmentary properties of these compounds have been determined. The following table of properties will show the superior tinting strength of the basic salts:

|  | Dibasic | Monobasic | Normal |
|---|---|---|---|
| PbO | 81.00% | 75.10% | 60.13%. |
| Specific gravity | 4.6 | 3.86 | 3.0. |
| Refractive index | 1.99 | 1.99 | 1.80. |
| Tinting power | 140 | 120 | 50–60. |
| Crystalline structure | Acicular | Acicular | Lamellar. |
| Oil absorption | 18.8 | 28.5 | 24.4. |
| Color | White | White | White. |

The tinting powers given in the above table were determined according to the method described by Gardner in his "Examination of Paints, Varnishes and Lacquers," ninth edition, 1939, page 35.

While normal lead phthalate is not new and is not claimed, it can be economically made according to the process of this invention. However, the basic products herein described are novel and are extremely useful as pigments in the formation of paints, enamels, varnishes and other pigmented compositions.

Having thus described our invention, we claim as new and useful the following:

1. A process for preparing a lead phthalate composition selected from the group consisting of dibasic, monobasic, and normal lead phthalate and mixtures thereof which comprises forming an aqueous slurry of lead monoxide and while agitating and maintaining the temperature of said slurry between about 15° C. and 100° C., slowly adding thereto phthalic acid in such amount that for each mole of phthalic acid, there are at least one and not more than 3 moles of lead monoxide.

2. A process for preparing a lead phthalate composition selected from the group consisting of dibasic, monobasic, and normal lead phthalate and mixtures thereof which comprises forming an aqueous slurry of lead monoxide and while agitating and maintaining the temperature of said slurry between about 75° C. to 95° C., slowly adding thereto phthalic acid in such amount that for each mole of phthalic acid, there are at least one and not more than 3 moles of lead monoxide.

3. A process for preparing a basic lead phthalate composition which comprises forming an aqueous slurry of lead monoxide and while agitating and maintaining the temperature of said slurry between about 75° C. to 95° C., slowly adding thereto phthalic acid in such amount that for each mole of phthalic acid, there are at least 2 moles and not more than 3 moles of lead monoxide.

4. A process for preparing normal lead phthalate which comprises forming an aqueous slurry of lead monoxide and while agitating and maintaining the temperature of said slurry between about 75° C. to 95° C. slowly adding thereto phthalic acid in amount so that for each mole of phthalic acid there is one mole of lead monoxide.

5. A process for preparing monobasic lead phthalate which comprises forming an aqueous slurry of lead monoxide and while agitating and maintaining the temperature of said slurry between about 75° C. to 95° C., slowly adding thereto phthalic acid in such amount that for each mole of phthalic acid there are 2 moles of lead monoxide.

6. A process for preparing dibasic lead phthalate which comprises forming an aqueous slurry of lead monoxide and while agitating and maintaining the temperature of said slurry between about 75° C. and 95° C., slowly adding thereto phthalic acid in such amount so that for each mole of phthalic acid there are 3 moles of lead monoxide.

7. A basic lead phthalate composition being characterized by white color, acicular crystal structure, refractive index of 1.99, and a tinting strength of from about 120 to about 140.

8. Monobasic lead phthalate corresponding to the formula, $PbO \cdot PbC_6H_4(COO)_2$, characterized by white color, acicular crystal structure, refractive index of 1.99, and tinting strength of about 120.

9. Dibasic lead phthalate corresponding to the formula $2PbO \cdot PbC_6H_4(COO)_2 \cdot \tfrac{1}{2}H_2O$, characterized by white color, acicular crystal structure, refractive index of 1.99 and a tinting strength of about 140.

ALEXANDER STEWART.
ADRIAN R. PITROT.
LEONARD M. KEBRICH.